UNITED STATES PATENT OFFICE.

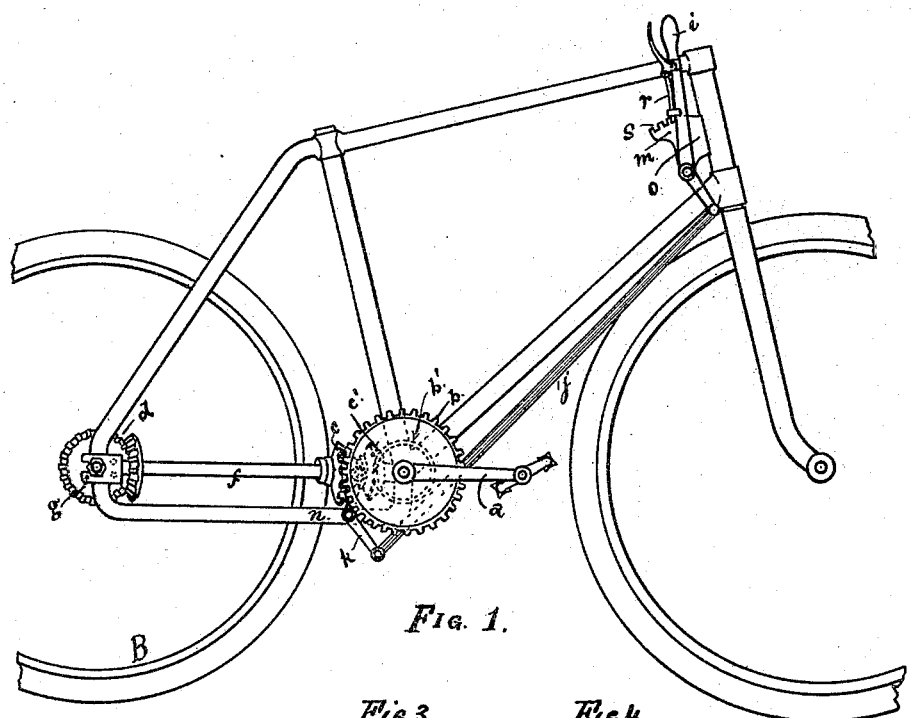
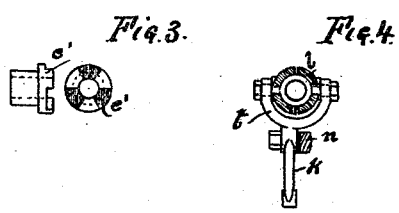
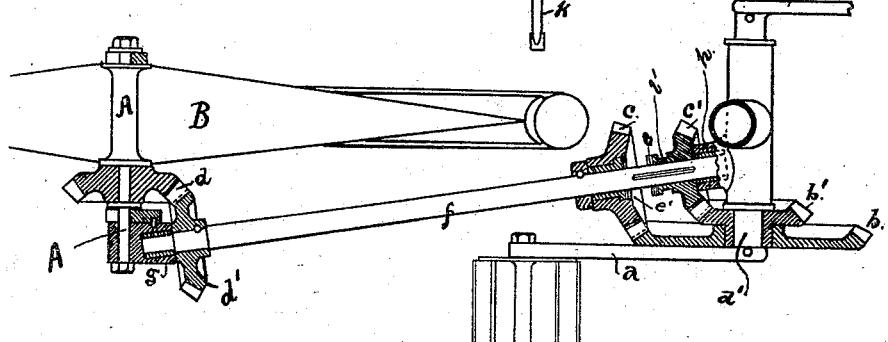

VICTOR H. NULLE, OF LEBANON, OHIO.

BICYCLE.

SPECIFICATION forming part of Letters Patent No. 500,938, dated July 4, 1893.

Application filed March 9, 1893. Serial No. 465,316. (No model.)

*To all whom it may concern:*

Be it known that I, VICTOR H. NULLE, a citizen of the United States, residing at Lebanon, in the county of Warren and State of Ohio, have invented certain new and useful Improvements in Bicycles, of which the following is a specification.

My invention relates to speed and power changing mechanism for bicycles, the features of which are fully set forth in the description of the accompanying drawings making a part of this specification, in which—

Figure 1 is a side elevation of my improvement attached to a bicycle. Fig. 2 is a transverse section through the plane of the driving gears. Fig. 3 is a detail view of the clutch mechanism, and Fig. 4 is a detail view of the clutch box and yoke.

$a$ represents the crank arms on which the pedals are mounted. $b\ b'$ bevel driving gears the hubs of which are secured to the pedal shaft $a'$.

$c\ c'$ represent bevel gears engaging respectively with the gears $b\ b'$. They are attached to the transmitting shaft $f$ which is journaled in the bearing $g$ in the ordinary way, or a ball bearing may be provided if desired. Shaft A of the wheel B also journals in like manner in said bearing $g$.

$d$ represents a gear wheel rigidly secured to shaft A which is driven by the gear $d'$ on the transmitting shaft $f$. The gears $b$, $c$, are employed when the bicycle is driven at ordinary speed. The gears $b'\ c'$ are the power gears for propelling the bicycle at a slower speed. In the preferred form of construction the gear $c'$ is splined upon the shaft $f$ and is normally out of engagement with the gear $b'$. Said gear is provided with a clutch $e$ on the end of its hub, which engages with the clutch face $e'$ of the gear $c$. The gear $c$ runs as an idler when the gear $c'$ is moved out of engagement with it, as shown in Fig. 2. When the parts are in the position there shown the gears $c'\ b'$ are driving the bicycle at a slower speed.

In order to move the gear I have provided the following instrumentalities: $j$ represents a connecting rod. $i$ represents a bellcrank lever pivoted to the bracket $o$, and the lower end of which is hinged to the connecting rod $j$. The opposite end of connecting rod $j$ is hinged to the bellcrank lever $k$ which journals on the frame $n$. The upper end of said bellcrank lever is provided with a yoke $t$ engaging with a clutch box $l$. This clutch box engages with the groove $l'$ in the hub of the bevel gear $c'$.

Mode of operation: The shipping bellcrank lever $i$ is provided with an ordinary spring lock $r$ engaging with teeth $s$ on the sector $m$. When the parts are in the position shown in Fig. 1 with the lock in the first notch, the bevel gear $c'$ is in the position shown in Fig. 2, and in position for propelling the bicycle at the slower speed. When the shipping lever is moved so that its catch engages with the second notch both gears $c\ c'$ travel as idlers, the bevel $c'$ being out of engagement with the bevel $b'$, and the bevel $c$ not being locked with the shaft. When the shipping lever is moved into the outer notch the bevel gear $c'$ is carried back to its furthermost position so that its clutch face engages with $e'$ and both clutches become locked to the shaft; the bevels $c$ and $b$ being in engagement and driving the bicycle at the normal speed.

Having described my invention, what I claim is—

1. In a bicycle, the combination of a pedal-shaft, provided at one end with bevel gears $b$, $b'$, a driving wheel A, a transmitting shaft $f$ geared to the driving wheel, and two bevel gears $c\ c'$, both mounted upon the transmitting shaft for engaging the bevel gears at one end of the pedal-shaft, said gear $c'$ being movable on the transmitting shaft into and out of engagement with the bevel gear $c$, substantially as described.

2. In a bicycle, the double driving mechanism consisting of the bevels $b\ b'$ mounted upon the pedal shaft $a'$, the bevels $c\ c'$ mounted upon the transmitting shaft $f$, and clutch formed on the hub of gear $c'$ and on the inner face of gear $c$, shifting mechanism engaging with the splined gear, whereby it is shifted longitudinally on the transmitting shaft to change the speed, substantially as specified.

3. In a bicycle, in combination with the transmitting shaft $f$, and the pedal shaft $a'$, the transmitting gears $c\ c'$ engaging respectively with the gears $b\ b'$, clutch mechanism for locking said gears $c\ c'$ together, and shipping mechanism connected with and adapted to operate the clutch mechanism for moving the gear $c'$ to its working or idle position, substantially as specified.

In testimony whereof I have hereunto set my hand.

VICTOR H. NULLE.

Witnesses:
 T. SIMMONS,
 C. W. MILES.